United States Patent [19]

Skaale

[11] 4,388,030
[45] Jun. 14, 1983

[54] ENDWISE PUSHDOWN GUIDE AND LATERAL RESTRAINT FITTING FOR CARGO

[75] Inventor: Douglas E. Skaale, Seattle, Wash.

[73] Assignee: The Boeing Company, Seattle, Wash.

[21] Appl. No.: 220,017

[22] Filed: Dec. 24, 1980

[51] Int. Cl.³ ............ B60P 1/64; B64C 1/20; B64C 1/22

[52] U.S. Cl. ............ 410/69; 244/118.1; 244/137 R; 410/72; 410/92; 410/69;70;77;92;94;30;72

[58] Field of Search ............ 244/118.1, 137 R

[56] References Cited

U.S. PATENT DOCUMENTS

| | | | |
|---|---|---|---|
| 1,073,892 | 9/1913 | Droste | 105/381 |
| 2,623,759 | 12/1952 | Forbas | 410/30 |
| 3,233,761 | 12/1966 | McCartney et al. | 414/536 |
| 3,357,372 | 12/1967 | Bader | 410/69 |
| 3,465,998 | 9/1969 | Ginn | 410/77 |
| 3,493,210 | 2/1970 | Brenner | 410/94 |
| 3,698,679 | 10/1972 | Lang et al. | 410/69 |
| 3,741,504 | 6/1973 | Alberti et al. | 410/69 X |
| 3,759,476 | 9/1973 | Goodwin | 410/69 |
| 3,874,538 | 4/1975 | Kessler et al. | 410/92 X |
| 3,906,870 | 9/1975 | Alberti | 244/137 R X |
| 3,933,101 | 1/1976 | Blas | 410/69 |
| 3,986,460 | 10/1976 | Voigt et al. | 410/69 |
| 4,134,345 | 1/1979 | Baldwin et al. | 410/70 |
| 4,203,372 | 5/1980 | Ivanov et al. | 410/69 X |

*Primary Examiner*—Robert B. Reeves
*Assistant Examiner*—Howard Beltran
*Attorney, Agent, or Firm*—Delbert J. Barnard; Eugene O. Heberer; Joan H. Pauly

[57] ABSTRACT

An endwise pushdown guide and lateral restraint fitting for cargo having a base adapted to be secured to an aircraft subfloor. The base supports to a pair of parallel pivot pins and pivotally secured on each pin is a respective blade normally extending in an upright position. Each blade is supported by a pair of lugs through which a respective pivot pin extends, the pin for each blade being remote therefrom to provide a moment arm from the pivot to the blade. The blades are parallel and have respective ramp surfaces, tapering toward the direction from which cargo may be moved along an aircraft floor. Thus, when a cargo container is moved against one tapering surface the horizontal force thereof has a downward component which acts on the tapering surface and the moment arm of that blade to cause the blade to pivot downwardly under the container so that it can be moved past what would otherwise be a restricting blade, the blades being adapted to restrict cargo on their lateral surfaces outwardly of the supporting base and pivots.

11 Claims, 6 Drawing Figures

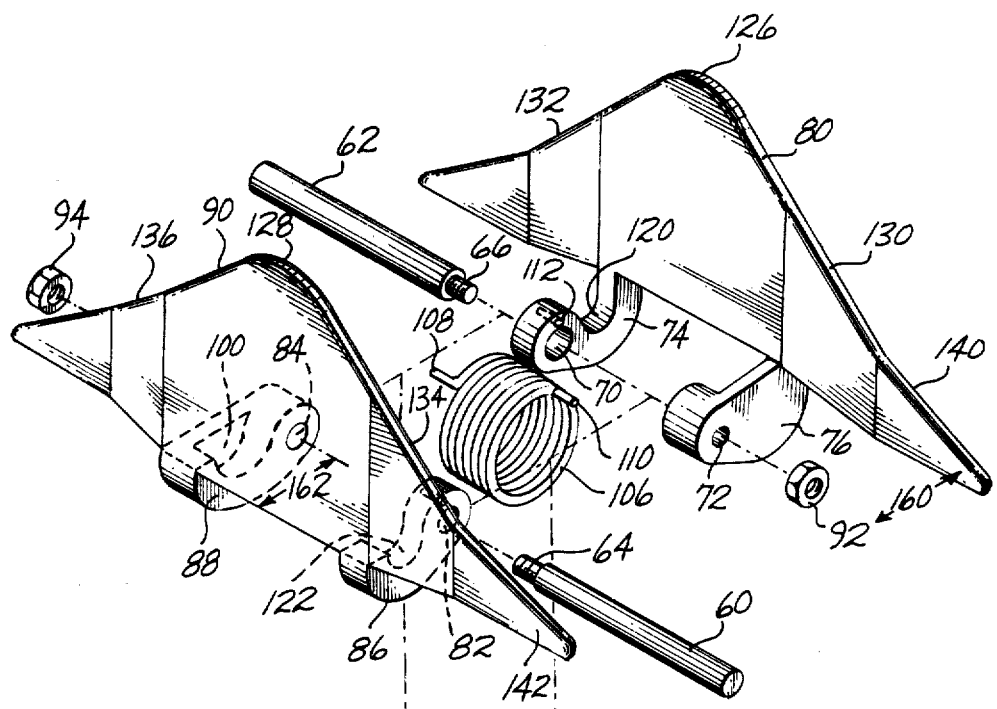
Fig. 3
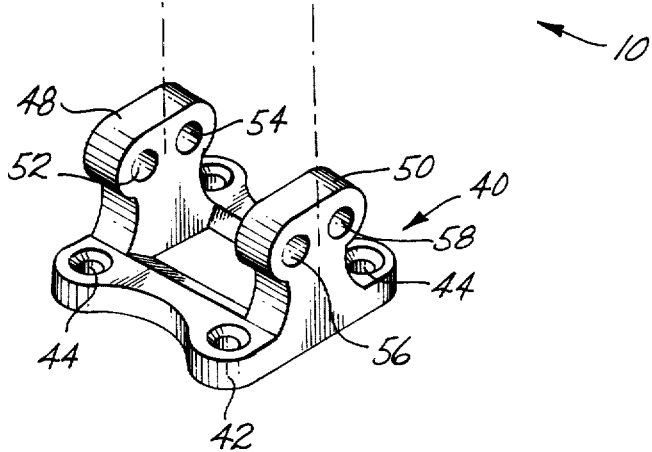

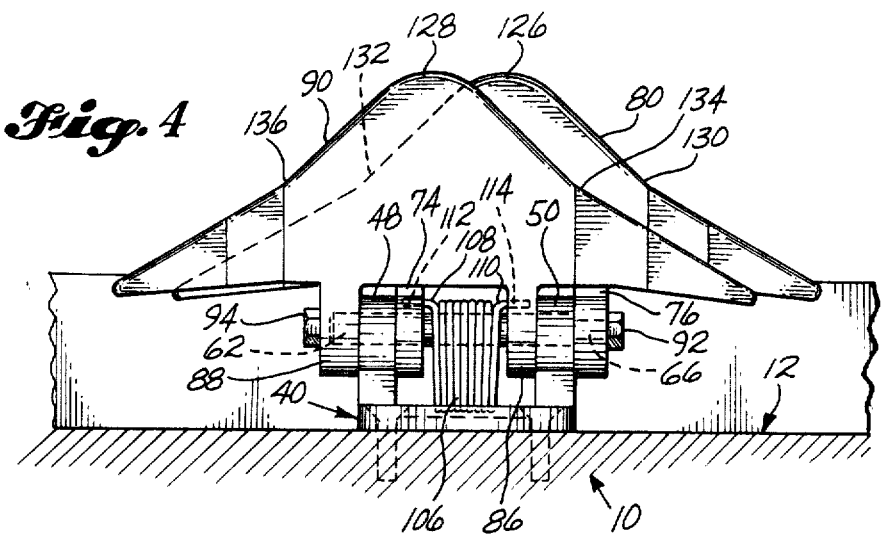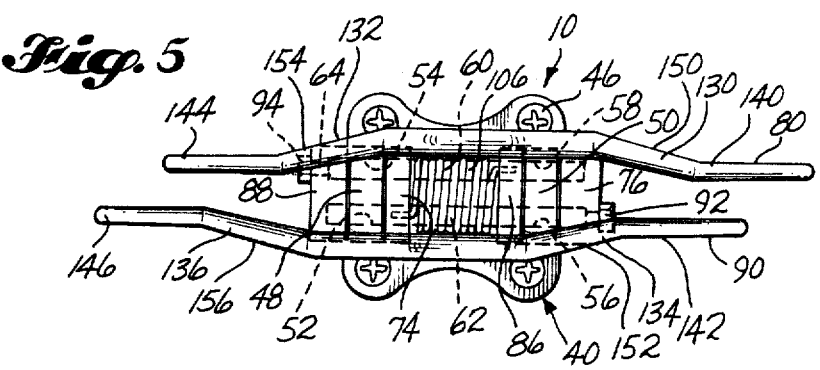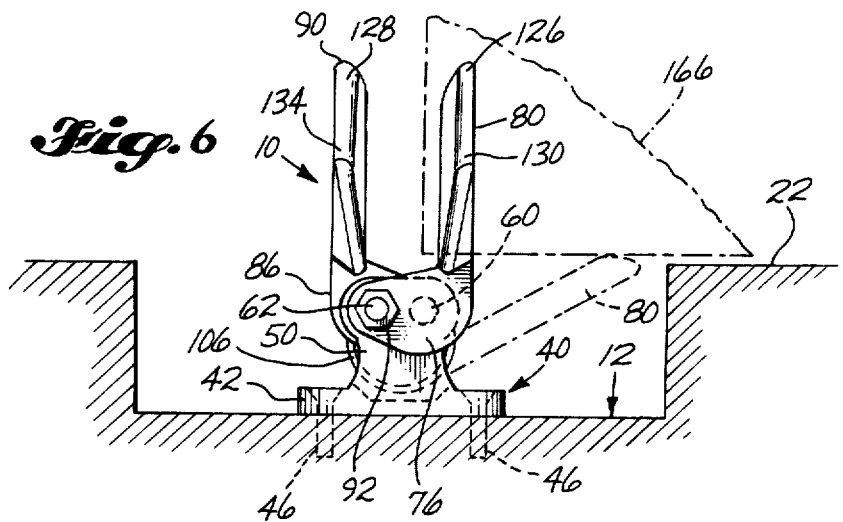

ENDWISE PUSHDOWN GUIDE AND LATERAL RESTRAINT FITTING FOR CARGO

BACKGROUND OF THE INVENTION

Cargo containers of three or more widths are typically received in cargo compartments of aircraft. Because the containers have different base widths, it is necessary to provide sidewise guidance and restraint fittings for the various widths, three for example.

This could be accomplished by using movable, adjustable, or controllable guide/restraint fittings. However, all three of the foregoing techniques involve unacceptable penalties in terms of cost, complication, manpower, and handling time requirements; and weight, in various combinations of the foregoing.

SUMMARY OF THE INVENTION

The present invention solves the foregoing problems by the provision of sidewise guidance/restraint fittings which accommodate three or more container base widths. The guidance/restraint fittings are completely passive in that they do not obstruct the loading or unloading of containers regardless of size. The cargo spaces have fixed guides on opposite sides thereof and a multiple series of rollers between on which the cargo containers are moved in and out.

Two or more rows of restraint fittings are positioned in the subfloor according to the size of the container widths to be loaded. The rows of restraint fittings are centrally positioned and laterally spaced in accordance with the size of the containers that they are to guide on loading and unloading and restrain against lateral movement while they are in the cargo space.

The individual pushdown guide and restraint fittings have two upwardly extending blades which are removably extended or secured in the upward position by means of a torsion spring. Containers of a particular size are moved between one of the rows of restraint fittings and the fixed guide rails at the side, or between the fixed side rails if wide enough. When the containers are wide enough so as to extend over one row of fittings, to be guided and restrained by another row, they are moved onto the row in the way thereof, the fittings being collapsed when the containers make contact therewith. That is, the containers rotate the upwardly extending blades, held by the spring, downwardly toward the floor under the container by the action on a moment arm between each blade and its supporting pivot.

Each blade has a tapered top ramp surface which extends toward a container moving thereagainst and the container force has a downward component which moves against the blade and acts on the moment arm to pivot the blade downwardly below the bottom of the container and out of the way, to permit the container to move thereover.

Accordingly, it is an object of the invention to provide an improved endwise pushdown guide and lateral restraint fitting for use in a cargo compartment in which the containers have various predetermined widths. The containers are guided as they are moved fore and aft within the aircraft and restrained laterally by the fittings against which they fit.

It is another object of the invention to provide a guide and restraint fitting over which a container will easily move by making endwise contact with the blades of the fitting and folding them sidewise to a position below the level of the container. The fundamental characteristics of the guide and restraint fittings, according to the invention, are that they resist forces applied laterally and fold down easily in response to endwise contact by an approaching container base.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 3 is an exploded view of the guide and lateral restraint fitting shown in FIG. 2;

FIG. 4 is a side elevational view of the guide and lateral restraint fitting installed in a subfloor surface of an aircraft;

FIG. 5 is a plan view of the device shown in FIG. 4; and

FIG. 6 is an elevational end view of the device shown in FIG. 4, and illustrating the operation thereof.

DESCRIPTION OF THE PREFERRED EMBODIMENT

Figure 1:
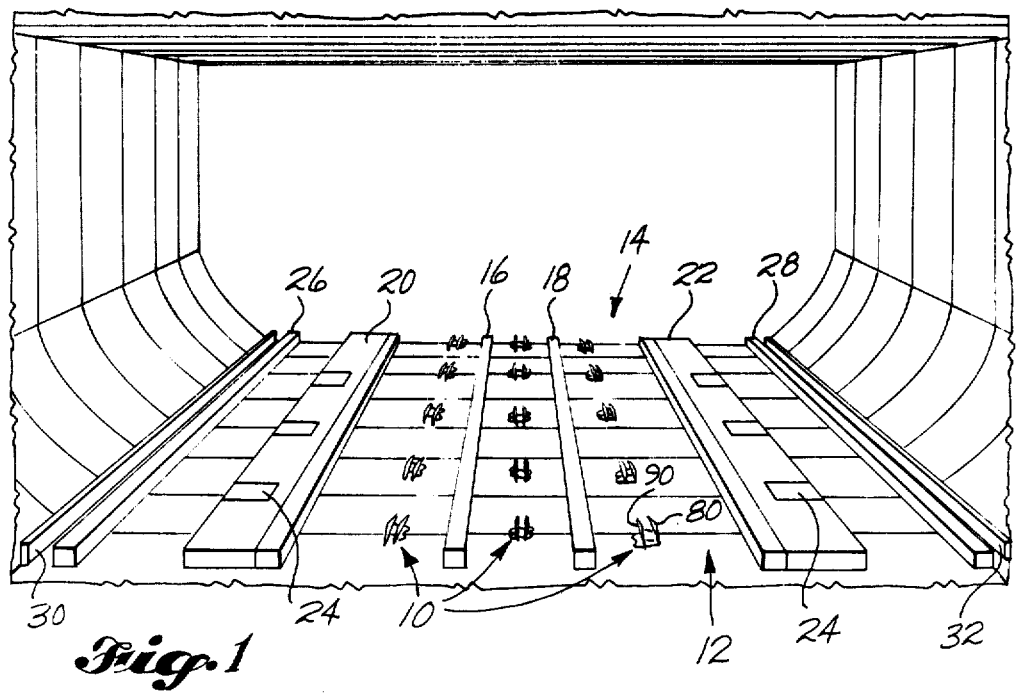
FIG. 1 is a perspective view illustrating a cargo floor space of an aircraft in which the present invention is used.
Figure 2:
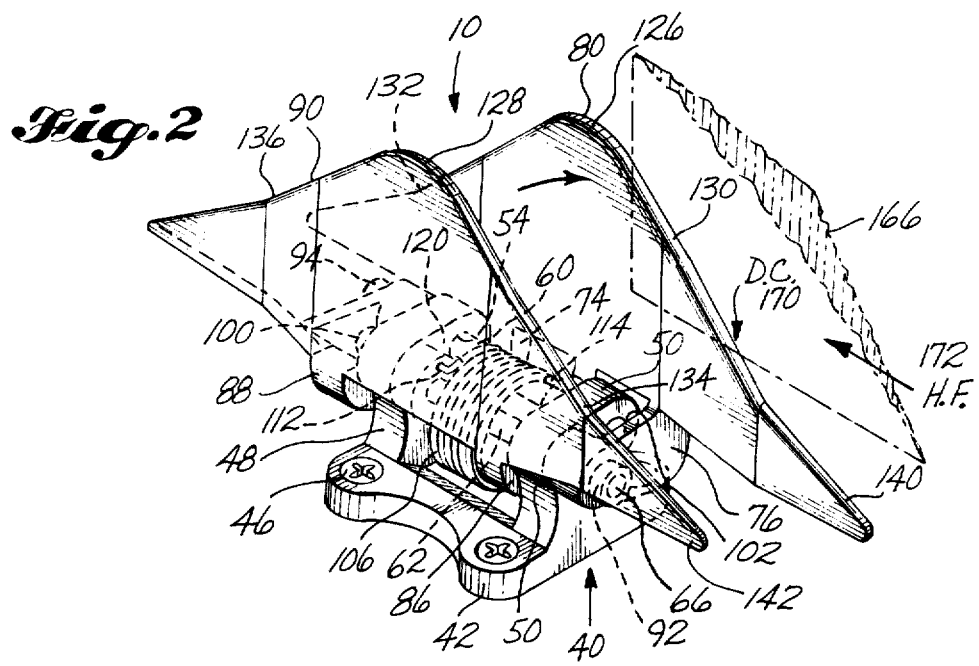
FIG. 2 is an isometric view of a pushdown guide and restraint fitting according to the invention.

Referring again to the drawings, there are shown in FIG. 1 three rows of endwise pushdown guide and lateral restraint fittings, generally designated as 10, installed in the lower lobe or subfloor 12 of an aircraft cargo compartment 14. The fittings 10 are installed in parallel rows and extend above the cargo support level which is defined by rails 16 and 18, support members 20 and 22 which support rollers 24 extending upwardly therefrom and on which the cargo is rolled inwardly and outwardly of the compartment. Support rails 26 and 28 at the outer edges are at the same level of the rails 16 and 18. At the outer edges are fixed guide and restraint rails 30 and 32.

Containers to be stored in the cargo compartment 14 are of predetermined widths, such as the largest being those restrained between the rails 30 and 32, and the others being of widths that are stored and laterally restrained between one of the rails 30 and 32 and any of the three rows of the fittings 10.

As shown in FIGS. 2-6, the fittings are comprised of a base member, generally designated as 40, having a bottom plate 42 and four screw holes 44 extending therethrough to receive screws 46 to secure the base to the subfloor 12. Extending upwardly from the base 42 are two parallel support members 48 and 50, FIG. 3. The member 48 has a pair of bores 52 and 54 having parallel centerlines and similarly, the member 50 has a pair of bores 56 and 58 having parallel centerlines, the bores 52 and 56 being in axial alignment and the bores 54 and 58 being in axial alignment, FIGS. 3 and 5. The bores 54 and 58 are adapted to support pivot pin 60 and the bores 52 and 56 are adapted to support pivot pin 62. The pins 60 and 62 each have a threaded, small diameter end 64 and 66, respectively. The pin 62 extends through bores 70 and 72 in lugs 74 and 76 which support a blade 80. Similarly, the pin 60 extends through the bores 82 and 84 in lugs 86 and 88, respectively, which support blade 90.

The pivot pin 62 is rotatable in the bores 52 and 56. It is fixed to rotate with the blade 80, being threadedly engaged in the tapped bore 72 through which it extends to receive a nut 92 to secure the pin and blade to the support 40. Similarly, the pin 60 is rotatable in the bores 54 and 58 and is fixed within the bores 82 and 84, being threadedly engaged in the latter and secured to the support by means of a nut 94.

The unthreaded end of the pin 62 fits loosely in a recess 100 in the lug 88. Similarly, the unthreaded end of the pin 60 fits loosely in a recess 102 in the lug 76, FIGS. 2 and 3. As may be seen in FIGS. 2–4 and 6, a coil spring 106 extends around the parallel pins 60 and 62 and between the lugs 74 an 86. The spring has its ends 108 and 110 engaged in bores 112 and 114 in the lugs 76 and 86, respectively. The spring 106, therefore, functions to hold the blades 80 and 90 in a biased upright position.

The lugs 74 and 86 have cutaway portions 120 and 122, respectively, FIG. 3, the lower surfaces of which engage pins 60 and 62, respectively. When the blades are in the upright position, the pins and the cutaway portions act as a stop against the force of the spring and limit the upward movement of the blades and support the blades against the lateral forces of the cargo.

The blades 80 and 90 have an upper central portion 126 and 128, respectively, and have tapering ramp surfaces 130, 132, and 134, 136 on their respective forward and rearward ends. The blades are laterally offset at their ends, FIG. 5, as at 140, 142, 144 and 146, toward each other, and similarly at 150, 152, 154 and 156 so that cargo not precisely aligned, hitting a surface such as 140 will be guided onto a surface 150 and generally in the direction of that side of the blade into the desired path. Similarly, if a container makes contact with the surface 142, it then makes contact thereafter with the surface 152.

The spacing of each pivot pin from the bottom of the blade provides a moment arm, between the arrows as at 160 and 162, FIG. 3. Thus, when a container as 166, FIGS. 2 and 6, has a width which causes it to move against a tapered portion as 130 of a blade, the downward component 170 of the horizontal force 172 of the container acts on the moment arm, as 160, to rotate the blade downwardly against the force of the spring 106 to a position under the container, FIG. 6, which is spaced above support members as 22 and 18 by the rollers 24 to permit the container to move over the blades of the fittings 10.

That is, when a blade is contacted endwise by a container its downward force component is generated at the point of contact on the ramp portion. This downward component acts around the offset pivot point to generate the moment which overcomes the return spring torque and deflects the blade out of the way of the oncoming container.

As indicated in FIG. 6 if the container had been in position to move endwise over both of the blades, the blade 90 would have been moved downwardly below the surface 22 toward the left side of the drawing. As a container moves endwise along the row of fittings 10, all of the blades are rotated downwardly out of the way of the container, the blades being folded sidewise as a result of the endwise contact acting on the moment arms, as 160 and 162.

One blade can be removed from a row of fittings if they are required to guide and restrain on one side only. The outer distal sides of the blade, with respect to the torsion springs, restrain the cargo containers laterally, along with the rails 30 and 32 or blades of possibly another row of fittings 10.

The invention and its attendant advantages will be understood from the foregoing description and it will be apparent that various changes may be made in the form, construction, and arrangements of the parts of the invention without departing from the scope and spirit thereof or sacrificing its material advantages, the arrangements hereinbefore described being merely by way of example. I do not wish to be restricted to the specific forms shown or uses mentioned except as defined in the accompanying claims.

What is claimed is:

1. An endwise pushdown guide and lateral restraint fitting for cargo, comprising:
   a base;
   two juxtaposed laterally spaced generally upright blades for laterally restraining cargo, said blades being pivotally mounted on said base;
   said base supporting two laterally spaced juxtaposed pivot pins;
   each blade being mounted to pivot on a respective pivot pin remote therefrom;
   a coil spring to normally retractably secure said blades in an upper pivotal position in a direction upwardly from said base, said spring having one end associated with one blade and the other end associated with the other blade so as to bias said blades toward and in said upper pivotal position;
   each respective blade being pivotal toward said base from said upper position when a force acting on and through a respective blade is applied to said coil spring through the association of the blade and spring; and
   means on each respective blade to receive said force and to direct a downward component of said force in a direction transverse to the force and downwardly toward said base to pivot the respective blade toward the base and below the force source.

2. The invention according to claim 1 in which:
   said means on each respective blade to receive said force is a respective downwardly tapering upper surface extending generally toward said force so as to receive the same;
   whereby said downward component of said force is adapted to act on respective tapering surfaces to pivot respective blades to below the force source.

3. The invention according to claim 1 in which:
   each blade normally extends generally vertically and in the direction of said downward component of said force;
   said means on each respective blade to receive said force is a respective downwardly tapering upper surface extending generally toward said force so as to receive the same;
   each blade being supported by a pair of spaced lugs, on and in turn supported by a respective pivot pin remote from the blade to provide a moment arm between the blade and its pivot pin so that the downward component of said force rotates the blade on its pivot pin against the bias of the coil spring to below the force source.

4. The invention according to claim 3 in which:

each blade at an end thereof is offset laterally toward its respective pivot pin adjacent where said force acts thereon.

5. The invention according to claim 3 in which:
at least one of said lugs of each pair extends under the pin supporting the other pair of lugs,
whereby each lug extending under each pin supporting the other pair of lugs is stopped as it is rotated upwardly by said spring to limit the rotation of each blade to a proper upright position so as to limit lateral movement of cargo containers against the blade in the upright position.

6. An endwise pushdown guide and lateral restraint fitting for cargo, comprising:
a base;
a normally generally upright, substantially flat-walled blade, having inner and outer generally flat, upright laterally spaced opposite sidewall surfaces; said blade being adapted to have an outer surface to make cargo restraining contact;
a pivot pin supported on said base; means connected to a lower end, vertically, of said blade and mounted to rotate on said pivot pin, said blade being laterally spaced from said pivot pin by said means connected at said lower blade end to provide a moment arm between the blade and the pivot pin;
said blade being mounted to rotate pivotally, laterally outwardly and downwardly relative to said base and on said means connected;
spring means to normally retractably secure said blade in an upper pivotal position upwardly from said base; said spring means being connected to said means connected to rotate said blade upwardly from a lower, laterally outwardly position;
said blade being pivoted toward said base and laterally outwardly from said upper position when a force acting on and through said blade is applied against the bias of the spring means; and
means on said blade to receive said force and to direct a downward component of said force in a direction transverse to the force and downwardly toward said base to pivot the blade toward said base and below the force source.

7. The invention according to claim 6 in which:
said means on said blade to receive said force is a downwardly tapering upper blade surface, spacing sidewalls of the blade, and extending generally toward said force so as to receive the same;
whereby said downward component of said force acts on the tapering surface and moment arm to pivot said blade to below the force source.

8. The invention according to claim 6 in which:
said blade normally extends generally vertically and in the direction of said downward component of said force;
said means on said blade to receive said force is a downwardly tapering upper surface extending generally toward said force so as to receive the same;
said means connected being a pair of spaced lugs extending substantially at right angles to said blade.

9. The invention according to claim 8 in which:
said blade at an end thereof is offset laterally toward said pivot pin adjacent where said force acts thereon.

10. The invention according to claim 9 in which:
stop means between said pivot pin and said blade and above one of said lugs to limit the upright position of the blade away from the base by the contact of the one lug with the stop means.

11. An endwise pushdown guide and lateral restraint fitting for cargo, comprising:
a base;
two laterally spaced generally upright blades for laterally restraining cargo against outer distal sides of the blades;
said blades being pivotally mounted on said base, said base supporting two laterally spaced pivot pins;
mounting supports on each blade for mounting each blade on a respective pivot pin remote from the blade;
spring means to normally retractably secure said blades in an upper pivotal position in a direction upwardly from said base, said spring means being associated with both blades so as to bias said blades in said upper pivotal position;
each respective blade being pivoted toward said base from said upper position when a force acting on and through a respective blade is applied to said spring means through association of the blade and spring means; and
means on each respective blade to receive said force and to direct a downward component of said force in a direction transverse to the force and downwardly toward said base to pivot the respective blade toward the base and below the force source.

* * * * *